March 8, 1960 HIDETOSI TAKAHASI ET AL 2,928,008

SIGNAL LOCKOUT DEVICE USED IN TELEPHONE EXCHANGE SYSTEM OR THE LIKE

Filed Feb. 12, 1957 6 Sheets-Sheet 2

March 8, 1960 HIDETOSI TAKAHASI ET AL 2,928,008

SIGNAL LOCKOUT DEVICE USED IN TELEPHONE EXCHANGE SYSTEM OR THE LIKE

Filed Feb. 12, 1957 6 Sheets-Sheet 3

March 8, 1960 HIDETOSI TAKAHASI ET AL 2,928,008

SIGNAL LOCKOUT DEVICE USED IN TELEPHONE EXCHANGE SYSTEM OR THE LIKE

Filed Feb. 12, 1957 6 Sheets-Sheet 4

United States Patent Office 2,928,008

Patented Mar. 8, 1960

2,928,008

SIGNAL LOCKOUT DEVICE USED IN TELEPHONE EXCHANGE SYSTEM OR THE LIKE

Hidetosi Takahasi, Zen-iti Kiyasu, and Nobuichi Ikeno, Tokyo, Japan, assignors to Nippon Telegraph and Telephone Public Corporation, Tokyo, Japan Application February 12, 1957, Serial No. 639,674

8 Claims. (Cl. 307—88)

This invention relates to improvements of electronic switching circuits and more particularly to devices for locking out signals in controlling circuits used for telephone exchange systems or the like.

Generally, in telephone exchange or electric computers, there is a device which has a plurality of input terminals and a single output terminal and which is designed to select one of the input terminals to be connected to the output terminal. In such a device, if one of the input terminals is selectively connected to the output terminal, the other input terminals are locked out and are not connected to the output terminal. Therefore, the device may be designated as a "signal lock out device."

Lockout devices used heretofore were of the type which employed a plurality of relays or discharge tubes or of the type which employed a plurality of relays with moving mechanical parts. In these types the speed of operation is not high, or else there is sufficient stability.

The lockout device according to this invention fundamentally makes use of at least two small core elements which have a primary winding and a secondary winding, respectively, the primary windings being connected serially and the secondary windings being connected serially in opposite polarity to that of the primary windings. A condenser is interposed between two outer terminals of the secondary windings so as to constitute a resonant circuit for controlling the signals. The resonant circuit for controlling the signal is known as a "parametron."

With reference to the "parametron," when a direct current and alternating current of frequency $2f$ are applied to primary windings of the cores in this invention, the inductance on the secondary windings of the cores varies with the frequency of $2f$ since the magnetic characteristic of the cores is of the non-linear type, so that the secondary windings and a condenser vary about the frequency of $f$. By "parametric excitation" is meant the function to change the resonance frequency of the resonance circuit by twice the frequency thereof and thereby are built up the oscillations having the frequency $f$ of the resonance circuit. The principle of these operations is well known physically and the operation may be shown by Mathier's equation.

The parametron can be made very small in size and cheap in the cost and, therefore, the device according to this invention has various advantages in its construction and function with respect to prior devices.

Devices according to this invention will next be described in detail with reference to the accompanying drawings, in which:

Fig. 1 is a circuit diagram of a parametron,

Figs. 2*a* to 2*e* are diagrams of parametron circuits,

Figure 5:
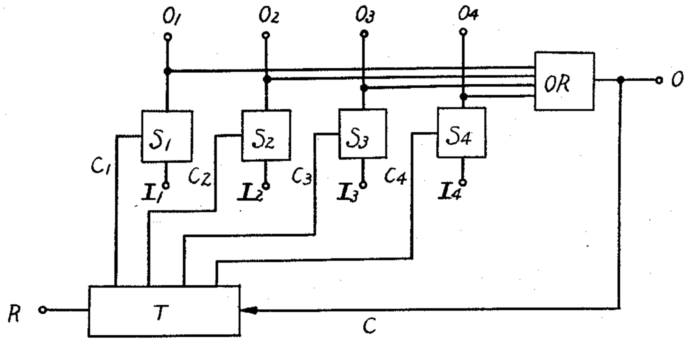
Figure 6:
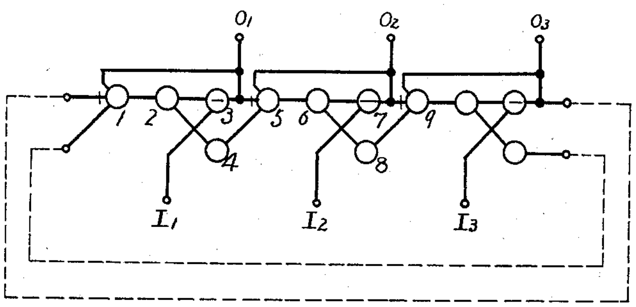
Figure 7:
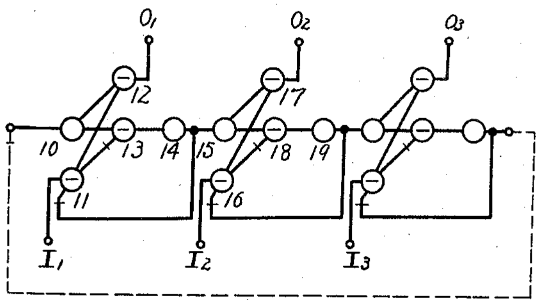
Figure 8:
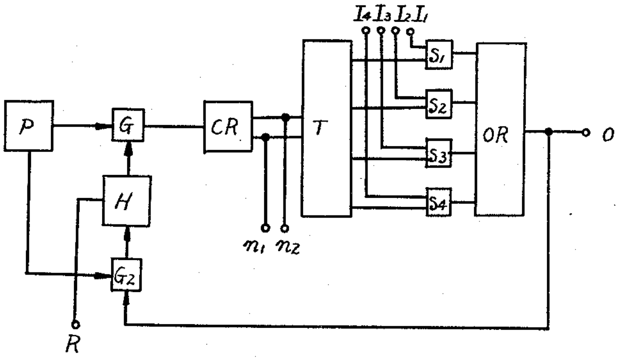
Figure 9:
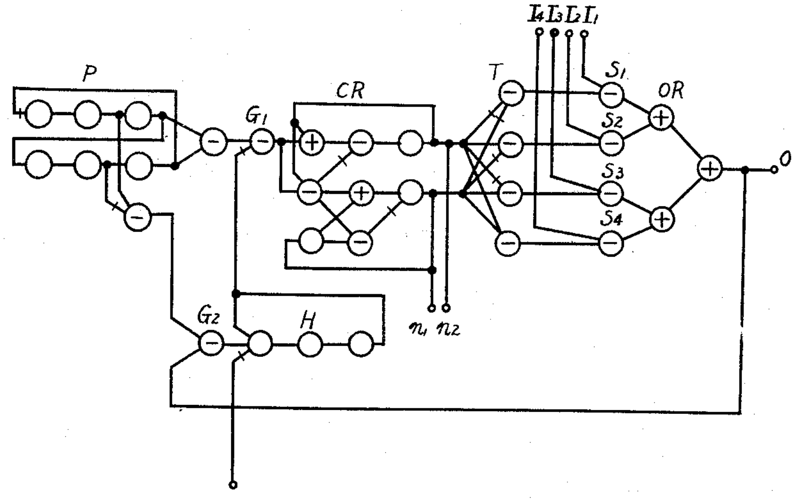
Figure 10:
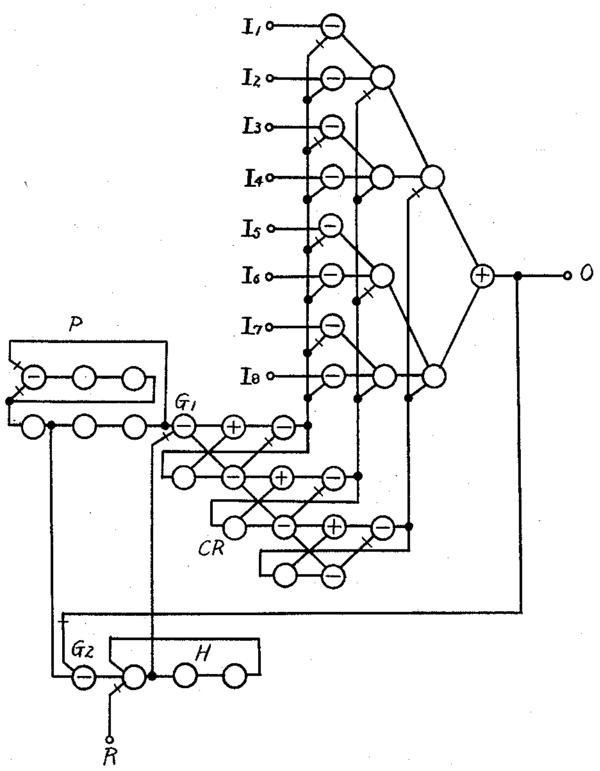
Figure 11:
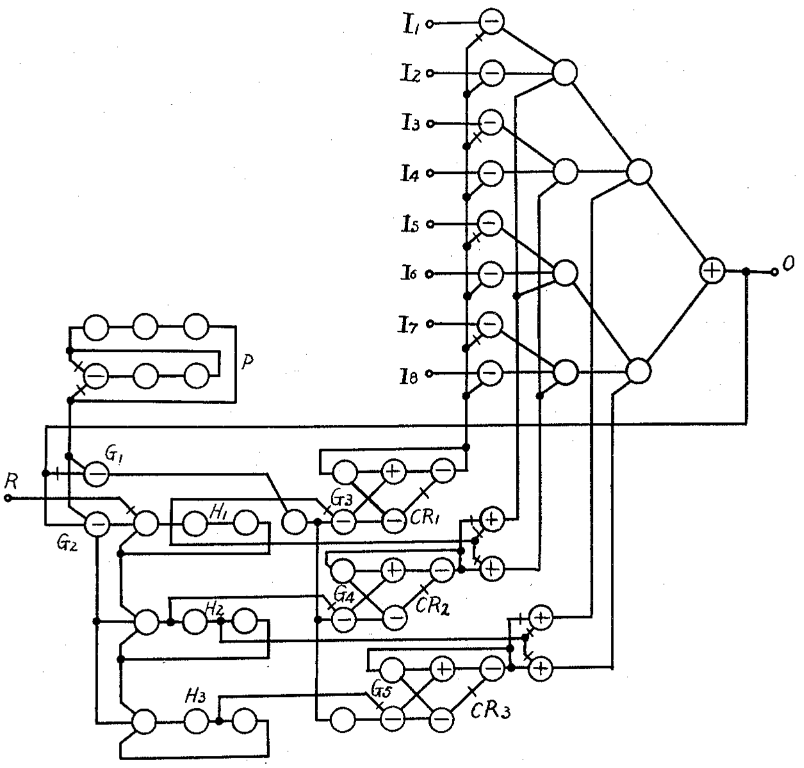

Fig. 5 is another example of a block diagram also showing the basic principle of this invention, Fig. 6 shows an example of this invention in which a single pulse is used as a control signal, Fig. 7 is another example of this invention in which a continuous signal is used as the control signal, Fig. 8 is a block diagram showing an example of this invention comprising a counter for counting control pulses and generating signals to sweep the input terminals, Fig. 9 is a circuit diagram of the example shown in Fig. 8, Fig. 10 is a circuit diagram according to this invention in which a tree circuit, a gate circuit, and an OR circuit are used in common, and Fig. 11 is a circuit diagram according to this invention in which the counter circuit comprised is divided into two portions.

Figure 1:
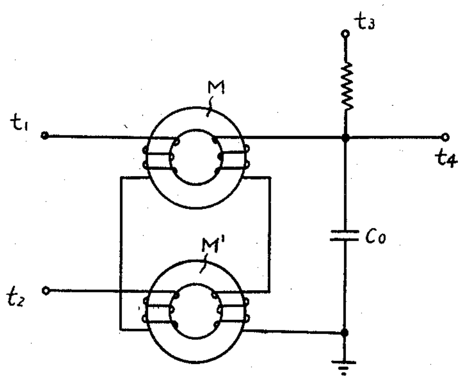

In the accompanying drawings, Fig. 1 shows an example of an oscillation generating circuit using parametric excitation; that is, a circuit of a parametron. The magnetic cores M and M' are toroidal cores made of ferro-magnetic material such as ferrite, and, for example, said magnetic cores have an outer diameter of four millimeters, an inner diameter of two millimeters, and a thickness of one millimeter, respectively. These magnetic cores M and M' are provided with primary windings and secondary windings respectively, said secondary windings being connected serially, and a condenser $C_O$ is interposed between two outer terminals of said secondary windings to constitute a resonant circuit having the natural frequency of $f$. The primary windings are connected serially in opposite polarity with respect to the secondary windings, and the two outer terminals of said primary windings are connected to terminals $t_1$ and $t_2$. The resonant frequency $f$ of said resonant circuit is selected, for example, as 1 mc., and an exciting alternating current of 2 mc. is applied across the terminals $t_1$ and $t_2$, whereby an oscillation of 1 mc. is generated in the resonant circuit. In this case, as the polarities of primary windings and secondary windings upon the magnetic cores M and M' are connected in opposite phase, the alternating current excitation of 2 mc. frequency introduced into secondary windings from the primary windings cancel each other and are eliminated in the secondary windings. The alternating current of 1 mc. frequency generated in said resonant circuit has a phase of, for example, either 0 radian or $\pi$ radians differing 180 degrees from each other. Therefore, when a controlling wave of very small amplitude of frequency $f$ is applied upon the controlling terminal $t_3$ simultaneously or a small period prior to the application of excitation wave upon the terminals $t_1$ and $t_2$, the phase of the generated oscillation becomes 0 radian when the phase of the controlling wave is within $$0\pm\frac{\pi}{2}$$

radians. Further, the phase of the generated oscillation becomes $\pi$ radians when the phase of the controlling wave is within $$\pi\pm\frac{\pi}{2}$$

radians. This oscillation output is taken from the output terminal $t_4$, and the exciting wave applied on the terminals $t_1$ and $t_2$ are superposed with a direct bias current in general.

A parametron is, as stated above, constituted by a resonant circuit comprising a non-linear element which is excited by a signal of twice the frequency of the resonant wave in order to generate a wave of resonant frequency and is used to control the phase of said resonant wave generated by the control wave. Though inductive elements are employed as the non-linear elements in the parametron shown in Fig. 1, a condenser made of ferroelectric material such as barium-titanate can be used as the non-linear element or elements. Furthermore, to avoid repetition of reference numerals, the circles shown in Figs. 2a–2d, 6, 7, 9, 10 and 11 represent cores similar to M and M'.

Figure 2:
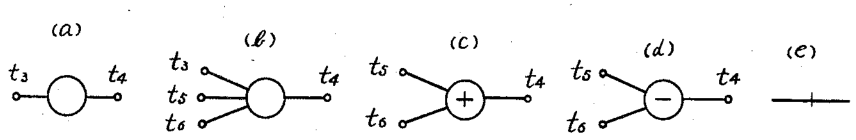

Figs. 2a, 2b, 2c, 2d and 2e are symbolic diagrams of parametrons. The terminals shown on the left hand of the small circle correspond to the input terminals for the control wave, the terminal shown on the right hand of the small circle corresponds to the output terminal for the generated oscillation signal, and the terminal for the exciting wave is eliminated. Therefore, Fig. 2a is a parametron having a single input terminal $t_3$ similar to the parametron shown in Fig. 1. When an odd number of controlling wave terminals are provided and controlling waves of either 0 or $\pi$ radians having approximately similar amplitude are applied to said controlling terminals, the phase of the oscillating wave is controlled by the majority of the phases of the controlling waves. Fig. 2b shows an example in which three control terminals $t_3$, $t_5$, and $t_6$ are provided.

In a parametron having three input terminals, a control wave having $\pi$ phase continuously is applied to the terminal $t_3$ and a binary information signal of either 0 phase or $\pi$ phase is respectively aplied to the other two terminals $t_5$ and $t_6$, the phase of the output oscillation wave becomes $\pi$ phase when either one of the binary information signals is $\pi$. A parametron having the character stated above, constitutes a logical sum circuit, that is, an OR circuit for the signal of $\pi$ phase, and this parametron is shown in Fig. 2c as a small circle with a (+) sign within it and with the elimination of the control terminal $t_3$. When, on one of the three input terminals, a control wave of 0 phase is applied continuously, a $\pi$ phase oscillation can be produced in the output when the information signals applied on the other two terminals both have $\pi$ phases. That is to say, such a circuit constitutes a logical multiple circuit or an AND circuit for the input signals of $\pi$ phase, and is expressed by the symbol shown in Fig. 2d. When the phase of the signal wave is reversed 180 degrees as for example by a transformer or the like, the signal of $\pi$ phase becomes a signal of 0 phase and a signal of 0 phase becomes a signal of $\pi$ phase, and this logical negative or NOT circuit is expressed symbolically as shown in Fig. 2e. Furthermore, information signals of $\pi$ phase and 0 phase are expressed by 1 and 0 (the binary numbers) respectively hereinunder.

Figure 3:
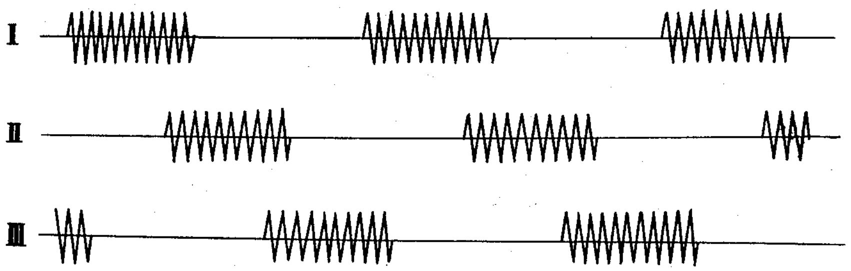
Fig. 3 shows the exciting waves for a parametron.

In general, a parametron system is constituted by connecting a plurality of parametron elements as described above in tandem, and the elements in the respective stages are excited by exciting waves I, II, and III oscillating intermittently in turns in slightly superposed manner as shown in Fig. 3. Thus, when an exciting wave I is applied to the parametron elements of the first stage with the parametron elements connected in tandem, the parametron elements of the second, third, fourth stages and so on are subjected to exciting waves II, III, I, II and so on in turn. Therefore, when the parametron elements of the second stage are caused to oscillate by the application of the exciting waves, the oscillation outputs of the elements of the first stage are applied to the input terminals of the elements of the second stage so that the oscillating phases of the elements of the second stage are controlled by the oscillating outputs of the elements of the first stage. Similarly, the oscillation phases of the elements of the third stage are controlled by the outputs of the elements of the second stage, and the oscillation phases of the elements of the fourth stage are controlled by the outputs of the elements of the third stage. The parametron systems shown in Figs. 6, 7, 9, 10, and 11 act to transmit information signals and logical calculations as stated above.

Figure 4:
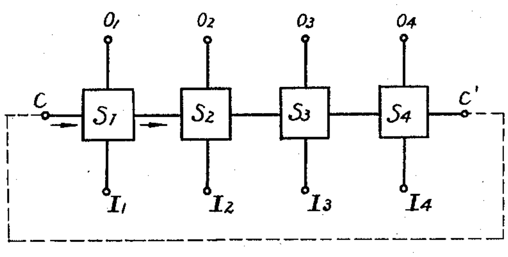
Fig. 4 is a block diagram showing the basic principle of this invention.

Fig. 4 is a block diagram showing the basic principle of this invention, and the switching circuits $S_1$, $S_2$, $S_3$, and $S_4$ have input terminals $I_1$, $I_2$, $I_3$, and $I_4$ and the control lines are connected in tandem as shown by terminals C and C'. As the forms of control signals, various kinds of signals may be used, but a case when a single pulse being used will be described. In this case, each switching circuit containing one holding circuit transmits the control pulse coming from the left terminal C to the rightward direction when the input signal is not applied to the input terminal, and it holds the control pulse in the holding circuit as a circulating pulse and transmits the output signal to the corresponding output terminal when the input signal is present. When only one control pulse is sent from the terminal C, only one holding circuit can hold it, and therefore, only one output terminal can transmit the output signal corresponding to one of the input terminals to which input signals are assigned. When the input signal is removed, the control pulse held in the holding circuit is resolved and transmitted to the rightward neighbor. Therefore, when the control line is connected in a loop condition as shown by the dotted line, it is not necessary to send into a control pulse from the terminal C at every time of the selection, and said pulse is regeneratively transmitted continuously. But in this circuit arrangement, no output signal can be generated externally if no control pulse existed in the circuit at the moment of the beginning of the operation. It is necessary to provide a circuit to insert a control pulse into the control line manually, or to provide a circuit to detect the condition when a pulse is not present in the switching circuit and to send a pulse to terminal C from this circuit. On the contrary, when a plurality of pulses are circulated in the circuit at first, owing to the random quality of the phase of the oscillation at the moment of switching or of the power source, two or more holding circuits can hold them simultaneously, but if there is such a period that only one input signal is assigned, respective pulses are gathered in the holding circuit for this input signal and constitute one control pulse, and normal operation will be maintained thereafter.

Fig. 6 shows an embodiment according to this invention in which parametron elements are combined to actuate three channels. As this is a parametron circuit, the input signals are assumed to be indicated by the parametron signals 1 for presence and 0 for absence of the signals. Now assume that an input signal is applied to the terminal $I_2$ only. At first, a control pulse is sent from the left and element 1 comes to the state 1. This state 1 is transmitted to elements 3 and 4 by way of 2, but as element 3 has a $I_1$ signal of 0 (that is, no input signal is present) said element 3 stops at the state 0. To the element 5, the negative signal of element 3 and outputs of elements 4 and 7 are applied respectively, but as first two assume condition 1, element 5 assumes state 1. This signal is further transmitted to elements 7 and 8 by way of element 6, but as $I_2$ is 1, element 7 assumes state 1, and the signal given to next element becomes 0. When the element 7 assumes condition 1, this signal is sent out to terminal $O_2$, and it is further returned to element 5 and maintained in the loop circuit constituted by elements 5, 6, and 7. When the signal at terminal $I_2$ is banished, the element returns to the state 0 and the signal of element 8 is sent to element 9.

The second form of control signal is a continuous signal, and the function of the switching circuits in this condition is to make the input line for the control signal switch over to the output terminals when an input signal is applied to the corresponding switching circuit prior to the transmission of the control signal through this circuit. Therefore, when signals are applied to the two terminals $I_2$ and $I_4$ of the circuit of Fig. 4, the control signal from the terminal C is switched over to the circuit $S_2$ and said signal appears at the terminal $O_2$ so that the control signal can not reach the switching circuit $S_4$. Thereby the signal can appear at only one output terminal. In this condition, when a signal is next applied to the terminal $I_1$, as a control signal has already passed through the circuit, this signal can not be switched over to the terminal $O_1$. If a circuit having this character is applied to a parametron system, signals of 1 and 0 are circulated in turn when the signal reaching end terminal C' is negated and returned to the starting terminal C. It is not necessary to transmit control signals to terminal C with an additional device at every selection.

Fig. 7 shows an embodiment of such a circuit. Let us assume a signal is applied to the terminal $I_2$, as an element 16 is at condition 1, the control signals coming from the left are transmitted to the terminal $O_2$ through the elements 10, 13, 14, 15, and 17. In this condition, when a signal is given to the terminal $I_1$, element 11 can not assume condition 1 as the element 14 is in the condition 1, and therefore a signal can not appear at the terminal $O_1$.

The above stated circuits show systems in which one or more control signals are transmitted serially through respective switching circuits. There is a system in which said one or more control signals are transmitted in parallel to respective switching circuits, as in the circuit in Fig. 5. In Fig. 5, T is a control signal generating device delivering signals to lines $C_1$, $C_2$, $C_3$, and $C_4$ in turn and is operated to maintain the state when a signal is provided on line C. Switching circuits $S_1$, $S_2$, $S_3$, and $S_4$ are simple gate circuits operating to transmit signals to the output terminals $O_1$, $O_2$, $O_3$, and $O_4$ from input terminals $I_1$, $I_2$, $I_3$, and $I_4$ when a control signal is present in said switching circuits, OR is a so-called OR circuit which acts to transmit output signal 1 when at least one signal 1 is present in the input circuits. Now assuming that an input signal is applied only on the terminal $I_3$, an output is generated on the terminal $O_3$, when the signal from the device T comes to the line $C_3$ after $C_1$, $C_2$. Simultaneously said output is transmitted to the line C through the OR circuit in order to stop the T circuit whereby it is maintained in a state to transmit control signals to line $C_3$ only. In this condition, when T is made to have a self-holding function and to hold its state as when the signal from line C is gone, a channel once connected is not disconnected when an input signal is interrupted, and an interrupted signal is transmitted to the terminal $O_3$ and a common output terminal O. Therefore, this circuit functions as a lockout circuit and simultaneously as a connection circuit. In order to break a channel once connected, a reset terminal R is provided to open said self-holding circuit.

Fig. 8 shows a more detailed block diagram of the system shown in Fig. 5. P is a device to generate pulses with definite time intervals, and the pulses generated in this device are transmitted to a counter CR through a gate $G_1$, stepping said counter by a single numeral, T is a tree circuit or a matrix circuit, functioning to give a mark signal to the out-going lines indicated by the counter CR. The signals passed through the gate circuits $S_1$ and $S_2$ are gathered by the OR circuit, and reach holding circuit H through a gate circuit $G_2$. When the circuit is maintained in the condition 1, the gate circuit $G_1$ is closed to the CR circuit to establish a connection. In this state, the signal from the counter output $n_1$, $n_2$ indicates the digit number of the input terminal connected. In order to break down the connection, it suffices to recover H by applying a signal from the terminal R.

In this circuit, $G_2$ is opened by the pulses from P, and the same time at which it is opened is determined in order that the signal through $G_2$ and H reaches $G_1$ at the same time when the pulse from P reaches $G_1$ directly. When the device $G_2$ is not provided, the tune interval at which H is held is too late for the signal applied to the input terminal at a certain instant as a finite time interval is necessary to pass a signal through S, OR and H or the like, and the device OR advances to the next number by the pulse from P through $G_1$, thereby causing an erroneous connection.

Fig. 9 is an embodiment of the system according to Fig. 8 employing parametron systems.

Fig. 10 is a modification of the circuit shown in Fig. 9 in which the number of parametron elements are decreased by making the tree circuit, S circuit, and OR circuit in common.

Fig. 11 is a circuit to select the input terminals according to each unit of the binary number by dividing a counter CR into three counters $CR_1$, $CR_2$, and $CR_3$ for the three units respectively and holding circuits $H_1$, $H_2$, and $H_3$ are associated with said divided counters. In the circuits previously known, when the number of the channels are increased two-fold, the selecting time interval is also increased two-fold. But in the improved device shown in Fig. 11, only the selecting time interval for one unit is increased, so that the circuit shown in Fig. 11 is advantageous when the number of input terminals is comparatively large.

What is claimed is:

1. A device for locking out signals and operative with a signal source of frequency $2f$ comprising a plurality of units including: two magnetic cores, primary windings on said magnetic cores and connected in series with said signal source, secondary windings on said magnetic cores in series and in bucking relationship so as to cancel signals generated by said primary windings, a capacitor bridging said secondary windings and constituting therewith a resonant circuit of frequency $f$, and an input terminal connected between the capacitor and one of said secondary windings; a signal from said source varying the inductance of said secondary windings and thereby the frequency of said resonant circuit about frequency $f$ to initiate oscillations in said resonant circuit; means for applying a control signal to said input terminal to control the phase of the oscillations; said device further comprising means for connecting the units for the transmission of signals therebetween.

2. A switching device comprising first and second magnetic elements, first and second primary windings respectively developed about said first and second magnetic elements, said first and second primary windings being in series aiding relationship and adapted to receive a signal having a frequency $2f$, first and second secondary windings respectively developed about said first and second magnetic elements, said first and second secondary windings being in series opposing relationship, a capacitor coupling the free ends of said secondary windings to form a resonant circuit having a resonant frequency $f$, at least one input terminal for injecting in said resonant circuit a signal of frequency $f$ and having selectively a first and second phase and an output terminal coupled to said resonant circuit for transmitting a signal having a frequency $f$ and one of said phases dependent on the phase of the signals injected in said resonant circuit by said input terminal.

3. The switching device of claim 2 including a plurality of input terminals for injecting in said resonant circuit a signal of frequency $f$ and having selectively a first and a second phase wherein said output terminal transmits a signal having a frequency $f$ and one of said phases in accordance with the phases of the signals injected by said input terminals.

4. A signal lockout device comprising a plurality of parametron switching elements each including two nonlinear inductors having primary and secondary windings and a capacitor connected serially with said secondary windings to constitute a resonant circuit having a natural frequency of resonance, means coupled to said element and supplying thereto an interrupted A.C. signal of a frequency twice that of the natural frequency of said resonant circuit, means coupling said parametron switching elements to each other and transmitting phase signals thereto, a control loop including said parametron switching elements, a plurality of input terminals and output terminals coupled to said control loop, a plurality of local loops coupled to said control loop, and means circulating a control pulse in said control loop when signals are absent at said input terminals and confining said control pulse to one of said local loops when an input signal to one of said input terminals is applied for transmitting a signal through an output terminal associated with said one input terminal.

5. A signal lockout device as claimed in claim 4, wherein said local loops each include one of the input terminals, and said control loop comprises said local loops serially coupled, said device further including means switching said control pulse from one local loop to another when input signals are absent from the input terminals and for retaining a control pulse in a local loop when an input signal is applied to the input terminal coupled to said last mentioned local loop.

6. A signal lockout device as claimed in claim 4, including means circulating a continuous series of control pulses in said control loop, inverting means in said control loop whereby control pulses are transmitted from said inverting means only when control pulses are absent at said inverting means, means associated with said local loops for switching over and transmitting control pulses to the associated output terminals and preventing the control pulses from advancing to succeeding local loops in the following part of said control loop when an input signal is applied to an input terminal during the interval when said control pulses are absent in said local loop associated with said input terminal.

7. A signal lockout device, whose elements are constituted by parametrons, comprising a control line and a local line, a plurality of input terminals, a plurality of gate circuits respectively associated with said input terminals, a source of lock pulses, a counter counting the lock pulses, a tree circuit responsive to said counter for sequentially opening said gate circuits, an output means responsive to said gate circuits, means for feeding an input signal received by one of said input terminals through an opened one of said gate circuits to said output means and to said local line to said control line wherein said signal is held, and means responsive to said signal in said control line for locking said counter for said opened gate in an open condition.

8. A signal lockout device as claimed in claim 7, wherein said counter is divided into a plurality of portions, said portions cooperating to sequentially open said gate circuits.

References Cited in the file of this patent

UNITED STATES PATENTS

| | | |
|---|---|---|
| 2,682,615 | Sziklai | June 29, 1954 |
| 2,723,354 | Isborn | Nov. 8, 1955 |
| 2,785,390 | Rajchman | Mar. 12, 1957 |